United States Patent [19]
Kato

[11] Patent Number: 5,615,196
[45] Date of Patent: Mar. 25, 1997

[54] DISK APPARATUS WITH OPTICAL HEAD CLEANING MEMBER

[75] Inventor: Kazunari Kato, Iwaki, Japan

[73] Assignee: Alpine Electronics, Inc., Tokyo, Japan

[21] Appl. No.: 493,436

[22] Filed: Jun. 22, 1995

[30] Foreign Application Priority Data

Jun. 30, 1994 [JP] Japan .................... 6-173715

[51] Int. Cl.⁶ .................................. G11B 33/14
[52] U.S. Cl. ........................................ 369/71
[58] Field of Search ............. 369/71–72; 360/128; 15/DIG. 12, 171, 159 R, 250 R, 250.1, 256.5

[56] References Cited

U.S. PATENT DOCUMENTS

| | | | |
|---|---|---|---|
| 5,245,601 | 9/1993 | Hake | 369/72 |
| 5,268,890 | 12/1993 | Colescott | 369/71 |

FOREIGN PATENT DOCUMENTS

| | | | |
|---|---|---|---|
| 2805991 | 8/1979 | Japan | 369/71 |
| 59-113540 | 6/1984 | Japan | 369/71 |
| 63-255839 | 10/1988 | Japan | 369/71 |
| 63-244467 | 10/1988 | Japan | 369/71 |
| 4-114327 | 4/1992 | Japan | 369/71 |
| 4-172631 | 6/1992 | Japan | 369/71 |
| 4-172630 | 6/1992 | Japan | 369/71 |
| 5-166217 | 7/1993 | Japan | 369/71 |
| 5-174411 | 7/1993 | Japan | 369/71 |

*Primary Examiner*—Robert S. Tupper
*Assistant Examiner*—Brian E. Miller
*Attorney, Agent, or Firm*—Guy W. Shoup; Patrick T. Bever

[57] ABSTRACT

A disk apparatus wherein a cleaning member and a shutter for cleaning and covering an optical head are actuated by the motor used to drive a head positioning member (such as a screw shaft). During a reading operation, a screw shaft is rotated by a motor in a clockwise or counter-clockwise direction, and a carriage meshed with the screw shaft is driven to move an optical head over a disk. When the reading operation is stopped, the optical head is moved by the screw shaft to a retracted position. After the optical head is fully retracted, the screw shaft is further rotated by the motor and the screw shaft is then moved along its axis relative to the optical head. As the screw shaft moves, it pushes against a drive member, which in turn causes a support member to rotate so that the optical head is cleaned by a cleaning member provided on the support member, and is covered by a shutter, which is also formed on the support member.

15 Claims, 7 Drawing Sheets

DISK APPARATUS WITH OPTICAL HEAD CLEANING MEMBER

FIELD OF THE INVENTION

The present invention relates to a disk apparatus which is used in vehicle-loaded or domestic audio equipment to reproduce and/or record signals on compact disks, minidisks, or other optical disks, and more particularly to a disk apparatus provided with a shutter covering a reading portion (such as an object lens) or a cleaning member slidably mounted over the reading portion.

DESCRIPTION OF THE RELATED ART

A disk apparatus for reading and/or recording signals on compact disks, minidisks, or other optical disks includes an optical head having an object lens mounted in its reading portion. The reading portion of the optical head directs a focused beam of detection light onto a disk. The detection light is reflected by the disk. The reflected light is then captured by the reading portion and is detected by a light receiving device also disposed in the optical head. Information stored on the disk is read based on the intensity of the reflected light.

The reading portion of the optical head faces and is positioned a predetermined distance from the disk. The reading portion is always exposed to an open space within the disk apparatus. Therefore, dust existing in the disk apparatus tends to deposit on the object lens of the reading portion. Deposition of dust on the reading portion reduces the amount of reflected light which is detected by the light receiving device, and hence deteriorates the accuracy of reading data from the disk.

In view of this, a first proposed prior art solution was to cover the reading portion of the optical head with a shutter during global change non-reading periods in which the optical head is not reading signals from the disk.

A second proposed prior art method was to slide a cleaning member, such as a brush, over the reading portion to remove dust during non-reading periods in which the optical head is not reading signals from the disk.

However, the first prior art method of providing a shutter requires a mechanism for moving the shutter to a position where it can reliably cover the reading portion, when the optical head is in the non-reading periods. Accordingly, a drive source for the shutter mechanism is needed, thereby complicating the structure of the disk, and hence increasing the apparatus size.

The second prior art method of sliding a cleaning member, such as a brush, over the reading portion requires a mechanism for sliding the cleaning member when the optical head enters the non-reading period. Accordingly, a drive source for the sliding mechanism is needed, thereby complicating the structure of the disk apparatus and increasing the size of the apparatus.

SUMMARY OF THE INVENTION

An object of the present invention is to overcome the above-mentioned problems associated with the prior art methods, and to provide a disk apparatus in which a shutter or a cleaning member is actuated by utilizing the power source used to actuate a head driver used for moving an optical head. By utilizing the head driver power source to actuate the cleaning member and/or shutter, dust, etc., is prevented from depositing on a reading portion of the optical head without requiring an additional power source for actuating the shutter and/or cleaning member.

Another object of the present invention is to provide a disk apparatus in which a cleaning member is slid with respect to a reading portion of an optical head by utilizing the torque generated by a disk rotating/driving member. With this arrangement, dust, etc. deposited on the reading portion can be removed without requiring an additional power source for actuating the cleaning member.

A disk apparatus according to a first embodiment of the present invention comprises a turntable (disk rotating/driving member), a carriage upon which is mounted an optical head positioned to face a disk, a head driver for reciprocally moving the optical head in a signal reading area corresponding to a signal recording area of the disk, and a drive member which is connected to and driven by a power source used to drive the head driver, the drive member being driven to operate after the carriage/optical head has moved to and stopped at a retracted position of the signal reading area. The drive member contacts and pivots a support member upon which is mounted one or both of:

a) a shutter positioned out of a reading portion of the optical head while the optical head is moving in the signal reading area, and moved to a position, in which the shutter covers the reading portion by the force applied to the drive member after the carriage/optical head has moved to and stopped at the retracted position of the signal reading area, or b) a cleaning member positioned out of the reading portion of the optical head while the optical head is moving in the signal reading area, and moved in a direction in which the cleaning member slides over the reading portion, by the force acting to move the drive member, after the carriage/optical head has moved to and stopped at the retracted position of the signal reading area.

In the above arrangement, the disk rotating/driving member is a turntable, driven by a motor, for rotating the disk while supporting a center of the disk. The reading portion of the optical head is, for example, an object lens for focusing a detection light beam onto the disk and then capturing the light reflected from the disk. Alternatively, a shutter (cover member) is used to cover the reading portion of the object lens.

The head driver comprises a motor, a reduction mechanism for speed-reducing an output of the motor, a head positioning member (screw) rotated by the output speed-reduced motor, and a fitting member meshed with the screw, the fitting member being connected to the carriage. When the screw is continuously rotated by the motor after the fitting member has moved in a predetermined direction to such an extent that the carriage/optical head reaches the retracted position of the signal reading area, the drive member is moved by the force acting to move the screw in a direction opposite to the moving direction of the fitting member.

The screw is, for example, a screw shaft having a length which is equal to the distance over which the optical head is moved in the signal reading area. In this case, the fitting member is a female threaded member which is moved in the longitudinal direction of the screw shaft upon rotation of the screw shaft. Alternatively, the fitting member may be in the form of teeth meshed with the screw. When the screw is a worm gear having a short axial length, the fitting member is a rack member meshed with the worm gear. The rack has a length which is equal to the distance over which the optical head can be moved in the signal reading area. The rack member is moved by the worm gear, and the optical head is reciprocally moved together with the rack member.

A disk apparatus according to a second aspect of the present invention comprises a disk rotating/driving member, a carriage upon which is mounted an optical head positioned to face the disk, a head driver for reciprocally moving the optical head in a signal reading area corresponding to a signal recording area of the disk, a support member for supporting a cleaning member used to clean a reading portion of the optical head, a drive member for moving the support member such that the cleaning member is moved to a position near the reading portion after the optical head has moved to a limit position of the signal reading area, wherein the disk rotating/driving member has a toothed portion formed partially along an outer circumference thereof, the support member having teeth formed thereon and meshed with the toothed portion when the cleaning member comes close to the reading portion, and torque of the disk rotating/driving member is transmitted to the support member through meshing between the toothed portion and the teeth so that the cleaning member is moved in a direction to slide over the reading portion.

In a preferred arrangement, the disk apparatus includes a return biasing member (return resilient member) for biasing the support member when the cleaning member is positioned close to the reading portion, and the support member is moved in a direction opposite to the biasing direction of the return biasing member by the toothed portion formed partially along the outer circumference of the disk rotating/driving member.

The drive member is moved by power of the head driver which is produced after the optical head has moved to a limit position of the signal reading area, and the support member is moved by the force acting to move the drive member to a position where the cleaning member comes close to the reading portion.

In accordance with the second aspect of the present invention, the disk rotating/driving member is a turntable, driven by a motor, for rotating the disk while supporting the center of the disk. The reading portion of the optical head is, for example, an object lens for focusing a detection light beam onto the disk and then capturing the light reflected from the disk. Alternatively, the reading portion is a cover member covering the object lens.

Also, in accordance with the second aspect, the head driver comprises a motor, a reduction mechanism for speed-reducing an output of the motor, a head positioning member (screw) rotated by the speed-reduced motor output, and a fitting member meshed with the screw and including the optical head. When the screw is continuously rotated by the motor after the fitting member has moved in a predetermined direction to such an extent that the optical head reaches the limit position of the signal reading area, the drive member is moved by the force acting to move the screw in a direction opposite to the moving direction of the fitting member.

The disk apparatus according to the first aspect of the invention operates as follows.

A disk is set on the disk rotating/driving member which rotatively drives the disk. The optical head having the reading portion positioned to face the disk with a certain gap left therebetween is reciprocally moved by the disk driver. The reciprocal movement corresponds to an area in which signals are read from the signal recording area of the disk. The optical head may be moved to a position slightly out of the signal reading area. While the optical head is reciprocally moving in the signal reading area in facing relation to the disk, no force acts on the drive member to move it and, therefore, the shutter and/or the cleaning member is not moved and remain positioned out of the reading portion of the optical head.

When the disk driver continues to produce power after the optical head has reached a retracted (limit) position of its reciprocal movement region, e.g., a limit position on the inner peripheral side of the disk, and has been stopped by a stop or the like, the head positioning member is moved along its axis while the optical head is kept stationary. Movement of the head positioning member causes movement of the drive member. When the drive member is moved, the force acting to move the drive member serves also to move the shutter to a position where it covers the reading portion. In other words, by continuously energizing the head driver to produce the power after the optical head has moved to the limit position of its reciprocal movement and has entered the non-reading period, the reading portion is covered by the shutter. During the non-reading period, therefore, the reading portion remains covered by the shutter and dust, etc. is less apt to deposit on the reading position.

Also, after the optical head has reached the limit position of its reciprocal movement region and has stopped moving, the cleaning member formed of a brush, butyl rubber or the like is moved in the direction to slide over the reading portion by the power of the head driver, thereby removing dust, etc. on the surface of the reading portion. In other words, by continuously energizing the head driver to produce the power after the optical head has stopped moving and has come into the reading halt period, the reading portion is cleaned.

In the case that the head driver comprises the motor, the reduction mechanism for speed-reducing the output of the motor, the screw rotated by the speed-reduced motor output and the fitting member meshed with the screw and fixedly connected to the optical head, when the screw is continuously rotated by the motor after the fitting member has moved in the predetermined direction to such an extent that the optical head reaches the limit position of the signal reading area, the drive member is moved by the force acting to move the screw in the direction opposite to the moving direction of the fitting member, whereupon the shutter and/or the cleaning member are also moved by that force.

The structure for moving the drive member by the power of the head driver produced after the optical head has been moved by the head driver to the limit position of its reciprocal movement region is not limited to the above-described one using the screw. For example, the structure may be arranged such that a slip mechanism is disposed in a power transmission line from the motor to make the power of the motor slipped in the slip mechanism at the time when the optical head is moved to the limit position of its reciprocal movement region and is stopped there, and the rotative power under slipping is applied to the drive member through a clutch.

Thus, the head driver is comprised of the motor and a power converter for converting torque of the motor into force acting to move the optical head. Further, a power switcher is provided which serves to move the drive member by utilizing the power in the course of transmission from the motor to the power converter after the optical head has moved to the limit position of its reciprocal movement region.

The disk apparatus according to the second aspect of the present invention operates as follows.

A disk is set on the disk rotating/driving member which rotatively drives the disk. The optical head, having the reading portion positioned to face the disk with a certain gap left therebetween, is reciprocally moved by the disk driver. The reciprocal movement corresponds to an area in which signals are read from the signal recording area of the disk. The optical head may be moved to a position slightly out of the signal reading area. While the optical head is reciprocally moving in the signal reading area in facing relation to the disk, the support member is not moved and the cleaning member is positioned out of the reading portion of the optical head.

When the optical head reaches a limit position of its reciprocal movement region, the drive member is operated, whereupon the support member is moved and the cleaning member comes to a position near the reading portion. At this time, the teeth provided on the support member are moved a position where they are able to mesh with the toothed portion formed partially along the outer circumference of the disk rotating/driving member. When the disk rotating/driving member is rotated for a predetermined period of time, the support member is moved through meshing between the toothed portion and the teeth so that the cleaning member slides over the reading portion to clean the same. In the case that the support member is biased by the return biasing member, whenever the partial toothed portion comes into mesh with the teeth on the support member as the disk rotating/driving member rotates, the cleaning member is reciprocally moved, enabling the reading portion to be repeatedly cleaned by the cleaning member.

In the disk apparatus according to the second aspect of the present invention, with the drive member operated after the optical head has reached the limit position of its reciprocal movement region, the cleaning member comes close to the reading portion. A control circuit is designed, for example, such that the disk rotating/driving member is always automatically rotated the predetermined number of times when the optical head reaches the limit position of its reciprocal movement region and enters the non-reading period, causing the cleaning member to clean the reading portion. Alternatively, the control circuit is designed to count the accumulated time of the reading operation and, when the resulting count exceeds a certain value, to rotate the disk rotating/driving member for a predetermined time to clean the reading portion after the optical head has entered the non-reading period. As an alternative, the rotating/driving member may be rotated to clean the reading portion only when a cleaning switch on a control panel is depressed.

In the case that the head driver comprises the motor, the reduction mechanism for speed-reducing the output of the motor, the screw rotated by the output speed-reduced by the reduction mechanism, and the fitting member held in mesh with the screw to be movable including the optical head, when the screw is continuously rotated by the motor after the fitting member has moved in the predetermined direction to such an extent that the optical head reaches the limit position of the signal reading area, the drive member is moved by the force acting to move the screw in the direction opposite to the moving direction of the fitting member, whereupon the support member is also moved by that force, moving the cleaning member to the position near the reading portion.

The structure for moving the drive member using the power of the head driver, which is produced after the optical head has been moved by the head driver to the limit position of its reciprocal movement region, is not limited to the above-described one using the screw. For example, the structure may be arranged such that a slip mechanism is disposed in a power transmission line from the motor to make the power of the motor slipped in the slip mechanism at the time when the optical head is moved to the limit position of its reciprocal movement region and is stopped there, and the rotative power under slipping is applied to the drive member through a clutch.

Thus, the head driver is comprised of the motor and a power converter for converting torque of the motor into force acting to move the optical head. Further, a power switcher is provided which serves to move the drive member by utilizing the power in the course of transmission from the motor to the power converter after the optical head has moved to the limit position of its reciprocal movement region.

DETAILED DESCRIPTION OF TIME PREFERRED EMBODIMENTS

Preferred embodiments of the present invention will be described below with reference to the drawings.

Figure 1:
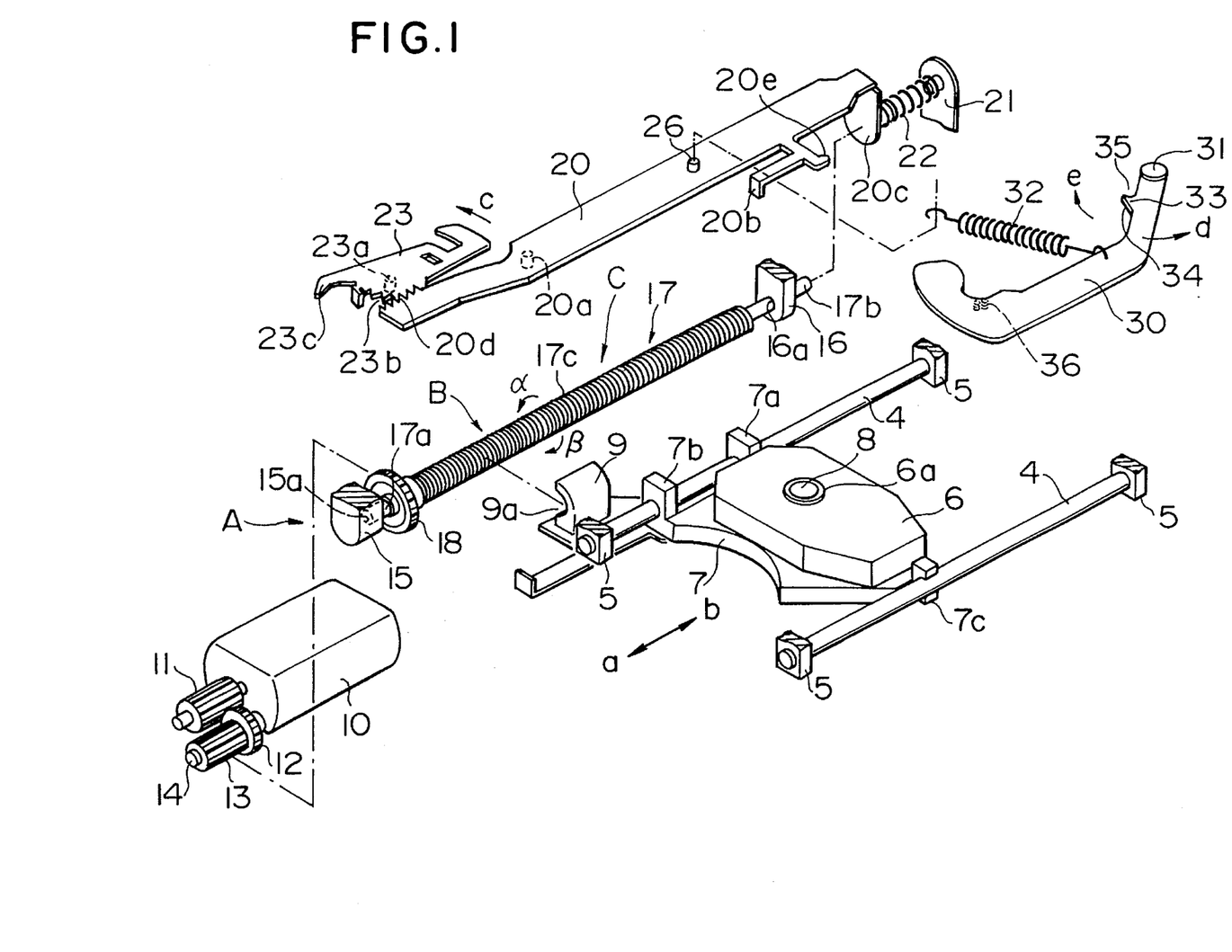
FIG. 1 is a partial exploded perspective view showing the structure of a head driver, a power converter, and a power switcher in a disk apparatus of the present invention.

FIGS. 3 to 9 are plan views of disk apparatus embodying the first and second embodiments of the present invention. FIG. 1 is a partial exploded perspective view showing an optical head, a head driver, and a drive member.

In each of FIGS. 3 to 9, a chassis of a disk apparatus is denoted by reference numeral 1. Mounted on the chassis 1 is a turntable 2, which serves as a disk rotating/driving member. A drive shaft 3 fixed to the turntable 2 is rotatably supported by a bearing held on the chassis 1. A spindle motor (not shown) is fixed to the underside of the chassis 1 and drives the turntable 2 to rotate, thereby causing an information bearing disk D set on the turntable 2 to also rotate. A cutout (opening) 1a is formed in the chassis 1, and an optical head 6 is disposed in the cutout 1a. A pair of shaft support members 5, 5 (shown in FIG. 1) are fixed to the underside of the chassis 1, and two guide shafts 4, 4 are fixedly mounted between the shaft support members 5, 5 such that the guide shafts 4, 4 are parallel to each other. A head base (carriage) 7, supporting the optical head 6, includes two bearings 7a, 7b which are slidably supported on a first one of the guide shafts 4, 4, and a bearing 7c which is slidably supported on the other of the guide shafts 4, 4. The head base 7 and the optical head 6 are guided by the guide shafts 4, 4 such that they move within the cutout 1a of the chassis 1 in the directions a and b.

The optical head 6 accommodates optical members such as a light emitting device for emitting a laser beam, which serves as detection light, and a light receiving device for receiving light reflected from the disk D. An object lens 8 is disposed in a reading portion 6a located on an upper surface of the optical head 6. The detection light is focused by the object lens 8 and is directed onto to the disk D. Also, the light reflected from the disk D is captured by the object lens 8.

As the optical head 6 reciprocally moves in the directions a and b while being guided by the guide shafts 4, 4, the reading portion 6a (the object lens 8) is moved over a recording area of the disk D. When the optical head 6 moves in the direction a and the bearing 7b hits against corresponding one of the shaft support members 5 (which serve also as stops), the optical head 6 reaches a limit position of its reciprocal movement in the direction a and, in this position, the reading head 6a faces an innermost peripheral area of the disk D.

A head driver A for moving the optical head 6 is shown in FIG. 1. The head driver A includes a motor 10. A pinion gear 11 is fixed to an output shaft 11a of the motor 10. A shaft 14 is fixed to a gear support (not shown) and rotatably supports a reduction gear 12 and a drive gear 13 which are arranged co-axially. Bearings 15 and 16 are fixed to the underside of the chassis 1 and support a switching shaft (head positioning member) 17. The switching shaft 17 has one end serving as a support shaft portion 17a and the other end serving as a push shaft portion 17b. The intermediate portion of the switching shaft 17 is formed into a screw shaft 17c.

The support shaft portion 17a is inserted and supported in a bearing hole 15a which is formed in the bearing 15. The bearing hole 15a has a bottomed end located within the bearing 15. The push shaft portion 17b is inserted and supported in a bearing hole 16a which is formed through the bearing 16. The switching shaft 17 is rotatably supported by both bearings 15 and 16. Also, the switching shaft 17 is slidably supported in the directions a and b with respect to the bearings 15 and 16. In the condition where a tip end of the support shaft portion 17a is in abutment with the bottom (inner end) of the bearing hole 15a in the bearing 15, the switching shaft 17 can no longer move in the direction a, but can move in the direction b from that position.

A driven gear 18 is integrally formed with the switching shaft 17 and is meshed with the drive gear 13.

The head base 7 is provided with a fitting (engaging) member 9, and female threads 9a formed on the fitting member 9 are meshed with male threads formed on an outer circumference of the screw shaft 17c.

In this embodiment, the motor 10, a reduction mechanism comprised of the pinion gear 11, the reduction gear 12, the drive gear 13 and the driven gear 18, the switching shaft 17 (the screw shaft 17c), and the fitting member 9 jointly make up the head driver A. The screw shaft portion 17c and the fitting member 9 jointly make up a power converter B for converting the power of the motor 10 into force for moving the optical head 6.

When the switching shaft 17 is driven by the motor 10 for further rotation after the bearing 7b has hit against the shaft support member 5 and the optical head 6 has reached the limit position from which it can no longer move in the direction a, the screw shaft 17c, which is meshed with the female threads 9a of the now-stationary fitting member 9, is allowed to move in the direction b. The switching shaft 17 (the screw shaft 17c) capable of moving in the direction b and the fitting member 9 jointly make up a power switcher C.

As shown in each of FIGS. 3 to 9, a drive member (drive lever) 20 is disposed on an upper surface of the chassis 1. A slide shaft 20a is fixed to the underside of the drive member 20, and a slide piece 20b is provided on a side of the drive member 20. The slide shaft 20a and the slide piece 20b are fitted in respective guide slots (not shown) defined in the chassis 1 so that the drive member 20 is supported and guided to be movable in the directions a and b.

The drive member 20 has a right end, as viewed in the drawing, formed into a bent piece 20c which is held in contact with a tip end of the push shaft portion 17b of the switching shaft 17. A support piece 21 is erectly formed on the chassis 1, and a spring 22, acting as a biasing member or a push member, is interposed under compression between the support piece 21 and the bent piece 20c. The drive member 20 is always biased by the compression spring 22 in the direction a. This biasing force is applied to the tip end of the push shaft portion 17b through the bent piece 20c and, therefore, the switching shaft 17 is also always biased in the direction a.

Teeth 20d are formed on a left end, as viewed in FIG. 1, of the drive member 20. A turn lever 23 is disposed on the upper surface of the chassis 1 and is supported by a pivot shaft 23a in such a manner as able to turn about the shaft 23a. The turn lever 23 has teeth 23b arrayed in the arcuate form about the shaft 23a. The teeth 23b are held in mesh with the teeth 20d. When the drive member 20 moves in the direction b, the turn lever 23 is turned in the direction c.

On the chassis 1 shown in each of FIGS. 3 to 9, there is disposed an photosensor (photoreflector) 24. A reflecting sheet is stuck to the underside of a detected or reflecting portion 23c formed by a part of the turn lever 23. When the turn lever 23 is further turned in the direction c from its position shown in FIGS. 3 and 6, the detected portion 23c moves across the photosensor 24. Therefore, a light on/off output from the photosensor 24 is first switched from a light non-receiving level (off-state) to a light reception level (on-state), and is then switched to a light non-reception level (off-state) again. By monitoring the light on/off output from the photosensor 24 by a control circuit, it is possible to detect that the turn lever 23 has completely turned in the direction c and the drive member 20 has moved a predetermined amount in the direction b.

The operation of the head driver A, the power converter B and the power switcher C shown in FIG. 1 will be described below.

When the optical head 6 reads signals from the disk D, the bearing 7b of the head base 7 is positioned away from the shaft support member 5, and the head base 7 including the optical head 6 is driven in the direction b or a. When the bearing 7b is away from the shaft support member 5, the drive member 20 is stopped in a position to which it has been moved under biasing of the compression spring 22 in the direction a. Also, the switching shaft 17 is pushed by the bent piece 20c of the drive member 20 to move in the direction a, and the tip end of the support shaft portion 17a of the switching shaft 17 is brought into abutment with the bottom (inner end) of the bearing hole 15a in the bearing 15. Accordingly, the switching shaft 17 is prevented from moving any further in the direction a.

The rotative power of the motor 10 in the head driver A is speed-reduced by the reduction mechanism, which comprises a gear train from the pinion gear 11 to the driven gear 18, for rotating the switching shaft 17. In the power converter B, when the screw shaft 17c of the switching shaft 17 is rotated in the direction α, the fitting member 9, having the female threads 9a, is driven to move in the direction b, whereupon the head base 7 and the optical head 6 are moved in the direction b. When the motor 10 is reversed in the rotating direction to rotate the switching shaft 17 in the direction β, the fitting member 9 is driven to move in the direction a, whereupon the head base 7 and the optical head 6 are moved in the direction a.

While the head base 7 and the optical head 6 are reciprocally moved in the directions a and b with the bearing 7b kept away from the shaft support member 5, the object lens 8 in the reading portion 6a moves across tracks in the recording area of the disk D for reading signals therefrom.

In this embodiment, the position where the reading portion 6a (the object lens 8) faces the innermost peripheral area of the disk D represents an initial (home) position. Whenever the read operation is stopped, the screw shaft 17c is rotated in the direction β so that the optical head is moved in the direction a.

When the bearing 7b of the head base 7 hits against the shaft support member 5, the optical head 6 reaches the limit position of its reciprocal movement in the direction a. Conventionally, the motor 10 is stopped when the optical head 6 has moved to that limit position. In this embodiment, however, when a switch on a control panel (not shown) is operated to stop reading, the motor 10 is kept energized to produce power for continuously rotating the screw shaft 17c in the direction β even after the bearing 7b of the head base 7 has hit against the shaft support member 5 and the optical head 6 has reached the limit position of its reciprocal movement in the direction a. The motor 10 continues to rotate until the light on/off output of the photosensor 24 is once switched to the light reception level (on-state) and is then switched to the light non-reception level (off-state).

With further rotation of the screw shaft 17c in the direction b after the head base 7 and the optical head 6 have reached the limit positions of their reciprocal movement in the direction a, the power converter C produces force acting to move the screw shaft 17 in the direction b, which is meshed with the female threads 9a of the now-stationary fitting member 9. Accordingly, the switching shaft 17 is moved in the direction b. During this movement of the switching shaft 17, the driven gear 18 continues receiving the torque while meshing the drive gear 13, which is elongated in an axial direction.

When the switching shaft 17 is moved in the direction b, the push shaft portion 17b pushes the bent piece 20c, moving the drive member 20 in the direction b. The force by which the drive member 20 is moved in the direction b also acts to turn the turn lever 23 in the direction c. Upon the detected portion 23c completely moving across above the photosensor 24 with the turning of the turn lever 23, the motor 10 is stopped in response to the light on/off output of the photosensor 24.

In other words, upon completion of a reading operation, the optical head 6 is moved in the direction a by the torque of the screw shaft 17c rotating in the direction β and then reaches the limit position of its movement. Even after that, the motor 10 is kept energized to continuously rotate the screw shaft 17c in the direction β, whereupon the power switcher C functions to transfer power to the drive member 20 from the head driver A, moving the drive member 20 in the direction b. Thereafter, the motor 10 in the head driver A is stopped. Consequently, in the non-reading or stopped condition of the disk apparatus, the drive member 20 stands still in the position to which it has reached after moving in the direction b.

If a reading start switch in the control panel (not shown) is depressed during the non-reading (or stopped) period in which the drive member 20 has been moved in the direction b, the motor 10 in the head driver A starts producing power to rotate the switching shaft 17 in the direction α. Because the switching shaft 17 is always subject to the biasing (pushing) force from the compression spring 22 in the direction a, the rotation of the screw shaft 17c in the direction α produces force acting to move the switching shaft 17 in the direction a with respect to the female threads 9a of the fitting member 9 (now kept stationary), thereby moving the switching shaft 17 in the direction a. Accordingly, the drive member 20 is also moved back in the direction a. After the support shaft portion 17a of the switching shaft 17 hits against the bottom (inner end) of the bearing hole 15a and is prevented from moving further in the direction a, the optical head 6 starts moving in the direction b by the torque of the screw shaft 17c.

In other words, the switching shaft 17 and the drive member 20 have been moved in the direction b during the non-reading or stopped period. But, if the reading operation is started in that condition, the switching shaft 17 and the drive member 20 are first returned in the direction a and, after the shaft portion 17a abuts the bottom of the bearing hold 15a, the optical head 6 starts moving in the direction b.

In the first and second embodiments of the present invention, when the drive member 20 is moved in the direction b, a support member (support arm) 30 is pivoted in the direction d. The drive member 20 and the support member 30 comprise a shutter/cleaning member positioning assembly.

As shown in FIGS. 3 to 9, the support member 30 has a base end supported on the chassis 1 by a pivot shaft 31 pivotally mounted in such a manner as able to turn in the directions d and e. A tension spring 32 is disposed as a return biasing member between a spring support pin 26 provided on the drive member 20 and the support member 30. The support member 30 is always biased in the direction e by the resiliency of the tension spring 32.

A substantially triangular cam projection 33 is formed as an integral part of the support member 30 near the position when the support member 30 is supported by the shaft 31. The cam projection 33 has an outer edge serving as a stop 34 and an inner edge serving as a lock recess 35.

Figure 3:
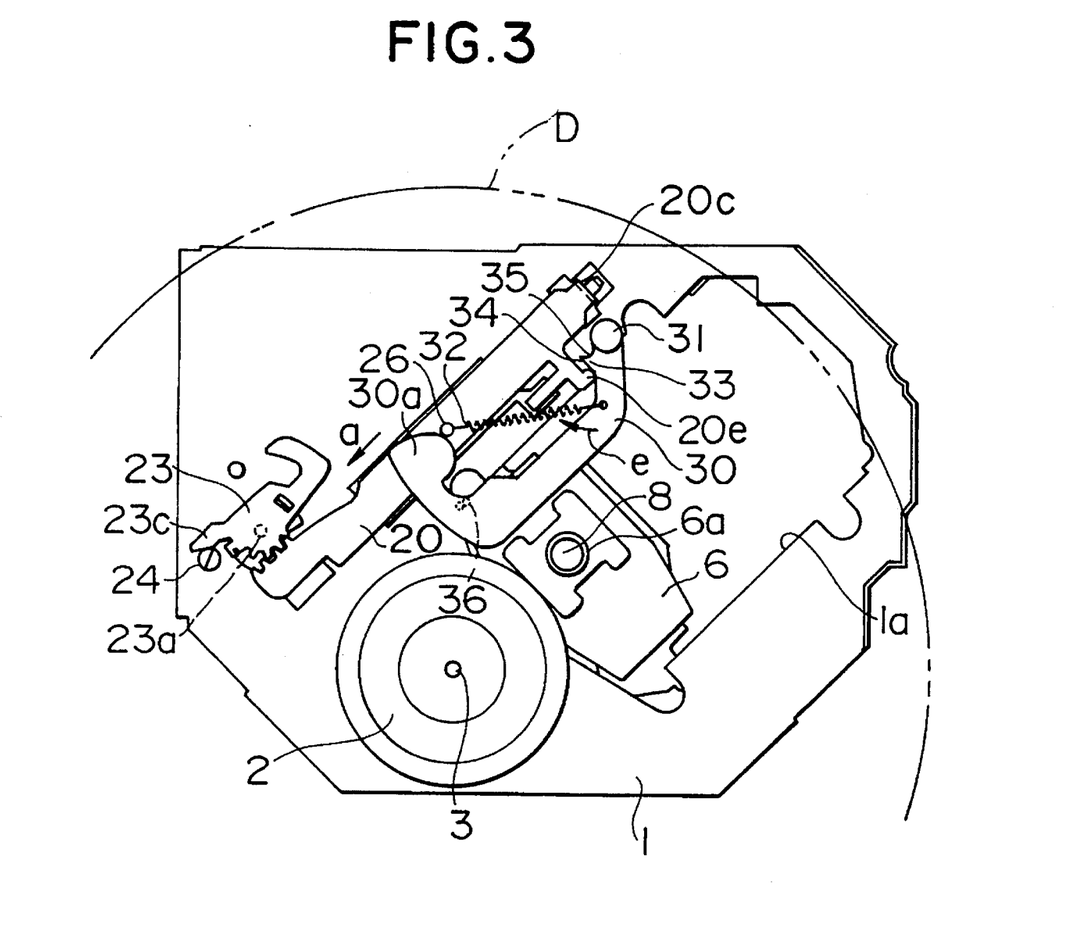
FIG. 3 is a plan view of a first embodiment of the invention, the view showing the condition where a shutter and a cleaning member are out of a reading portion.
Figure 6:
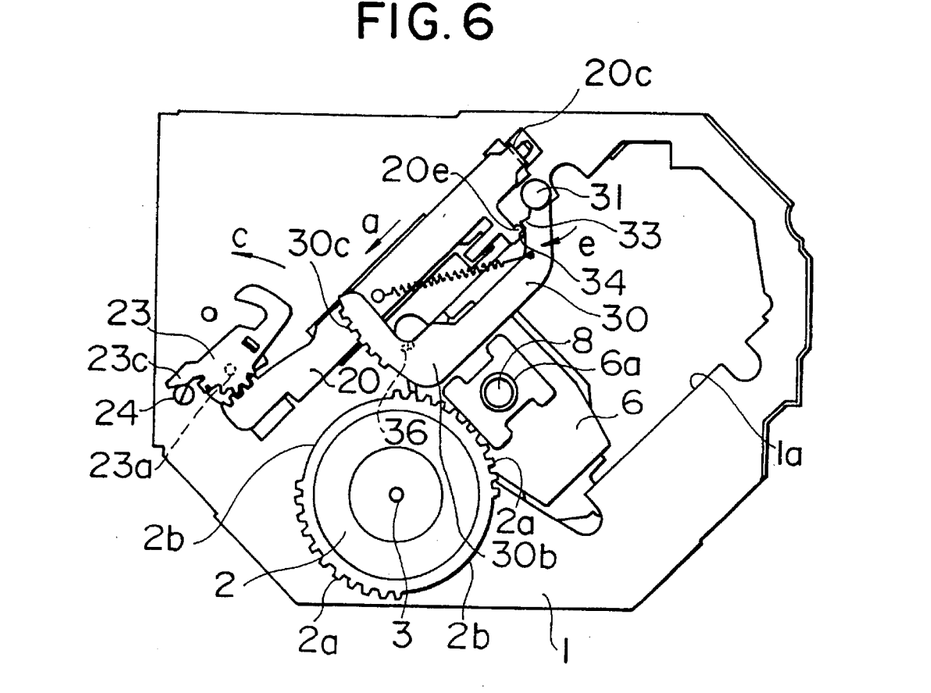
FIG. 6 is a plan view of a second embodiment of the invention, the view showing the condition where a shutter and a cleaning member are out of the reading portion.

As shown in FIGS. 3 and 6, in the condition where the switching shaft 17 is moved in the direction a and the drive member 20 is pushed by the compression spring 22 to move in the direction a, the support member 30 is turned in the direction e by the tension spring 32 and the stop 34 is held in abutment with a push lug 20e formed as part of the drive member 20.

Figure 4:
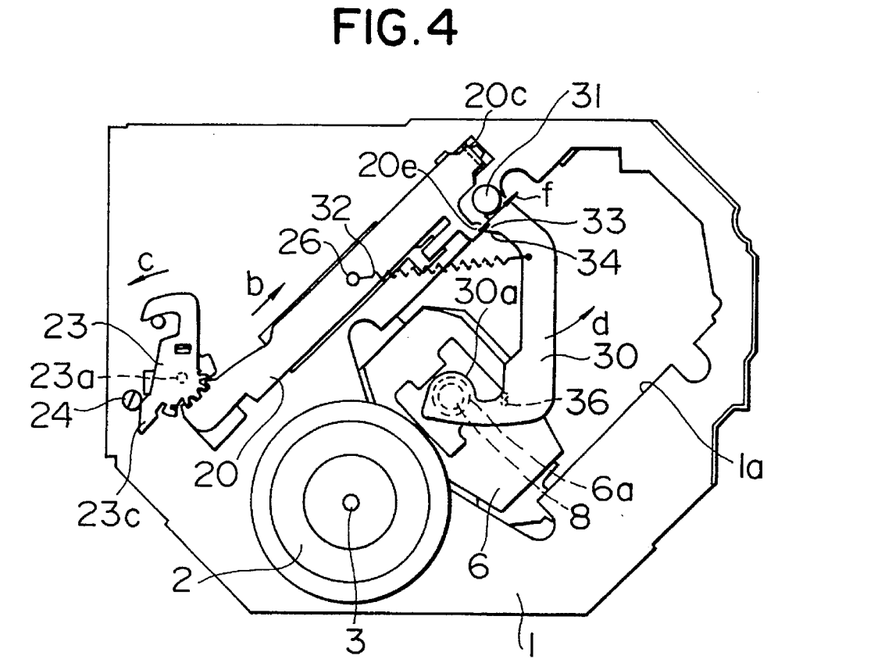
FIG. 4 is a plan view of the first embodiment of the invention, the view showing the condition where the shutter and the cleaning member are moving toward the reading portion.
Figure 5:
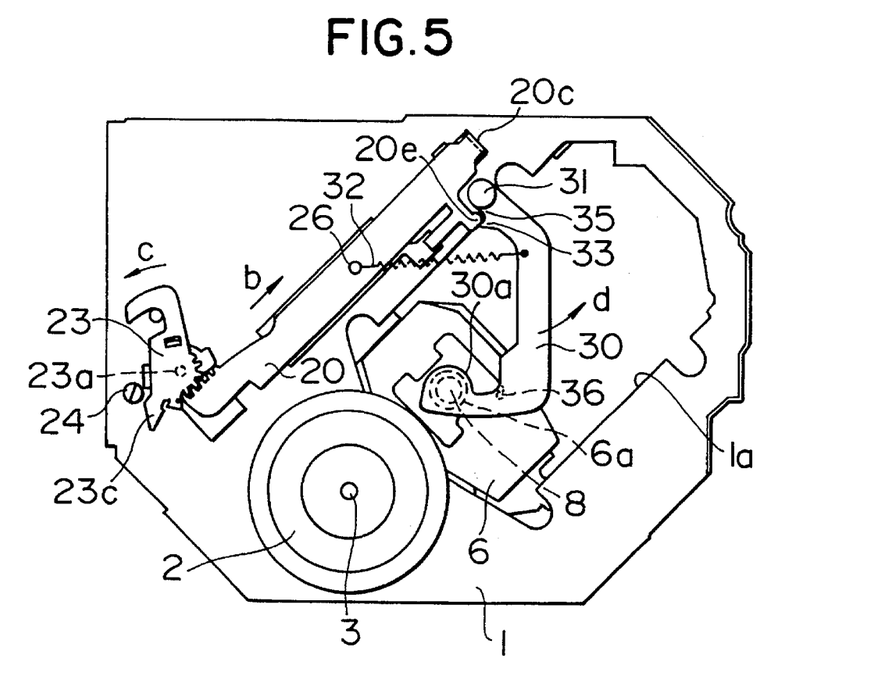
FIG. 5 is a plan view of the first embodiment of the invention, the view showing the condition where the reading portion is covered by the shutter.
Figure 7:
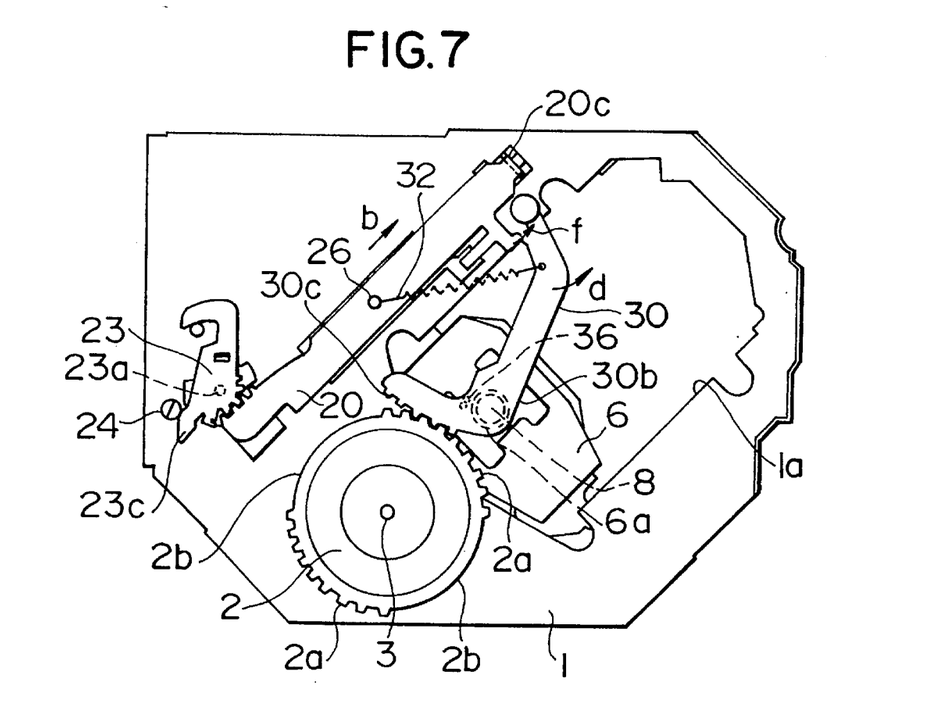
FIG. 7 is a plan view of the second embodiment of the invention, the view showing the condition where the shutter and the cleaning member are moving toward the reading portion.
Figure 8:
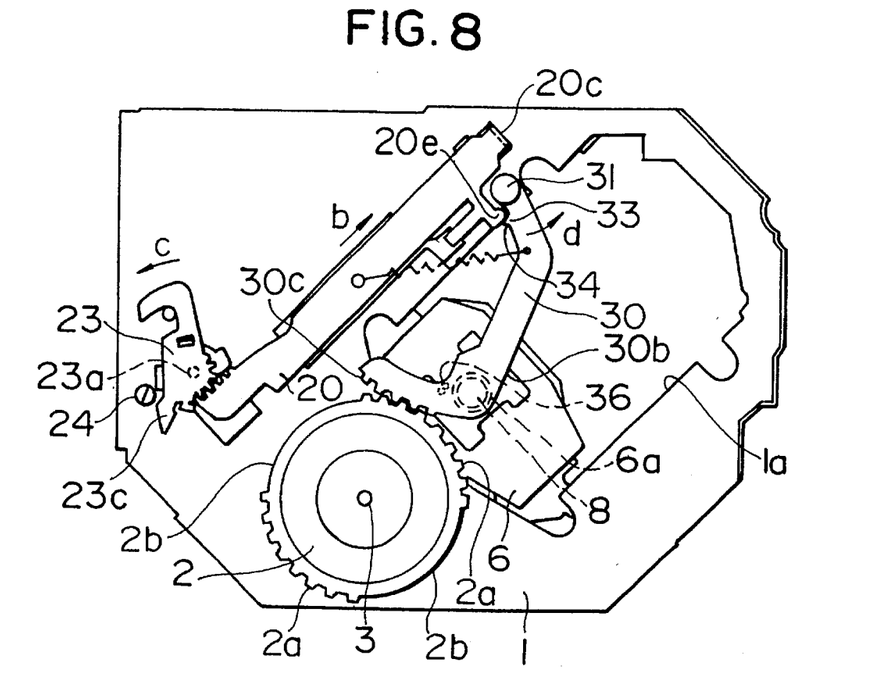
FIG. 8 is a plan view of the second embodiment of the invention, the view showing the condition where the cleaning member reaches the vicinity of the reading portion and the reading portion is covered by the shutter.

When the drive member 20 starts moving in the direction b, the stop 34 is pushed by the push lug 20e of the drive member 20. As shown in FIGS. 4 and 7, the force f of the push lug 20e pushing the stop 34 causes the support member 30 to start moving in the direction d against the biasing force of the spring 32. As shown in FIGS. 5 and 8, when the drive member 20 moves to a limit position in the direction b, the push lug 20e of the drive member 20 rides over the cam projection 33 and fits into the lock recess 35. While the support member 30 itself is further pivotable in the direction d beyond the position shown in FIGS. 5 and 8, it is stopped there because of being pulled by the tension spring 32.

When the reading operation is started and the drive member 20 is returned in the direction a, the support member 30 is turned in the direction e for moving back to the position shown in FIGS. 3 and 6.

In the embodiment of the first invention shown in FIGS. 3 to 5, a fore end of the support member 30 serves as a shutter 30a. As shown in FIG. 3, in the condition where the optical head 6 is moved in the directions a and b for reading and the drive member 20 is returned in the direction a, the shutter 30a at the fore end of the support member 30 is positioned out of the reading portion 6a of the optical head 6. When the reading operation is stopped, the optical head 6 is moved to the limit position in the direction a, and the switching shaft 17 and the drive member 20 are moved in the direction b, resulting in the condition shown in FIG. 5. Simultaneously, the support member 30 is turned in the direction d so that the push lug 20e fits into the lock recess 35. At this time (precisely at the time represented by the condition of FIG. 4), the reading portion 6a of the optical head 6 is covered by the shutter 30a.

In other words, during the non-reading or stopped periods of the disk apparatus, the reading portion 6a is always covered by the shutter 30a and, therefore, dust is less likely to deposit on the surface of the object lens 8 in the reading portion 6a.

Figure 2A:
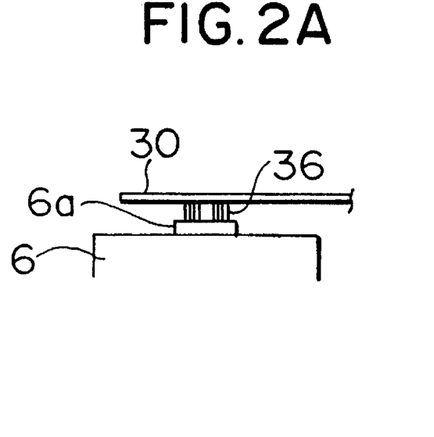
FIGS. 2A and 2B are enlarged side views showing the structure of cleaning members according to different embodiments of the present invention.
Figure 2B:
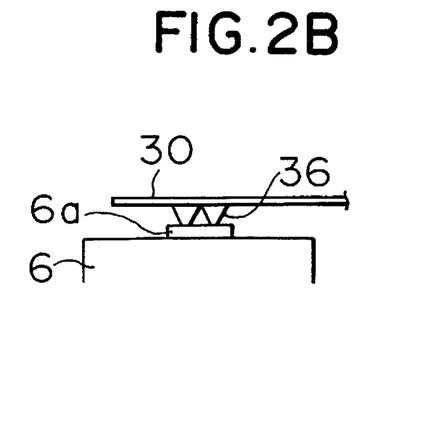

As shown in FIGS. 3 to 5, a cleaning member 36 is disposed on the underside of the support shaft 30 in a position closer to a base end thereof than the shutter 30a. The cleaning member 36 is a brush as shown in FIG. 2A. The brush is formed of soft hair-like material such as fine synthetic fibers or fur. Alternatively, as shown in FIG. 2B, the cleaning member 36 may be formed of a soft elastomer such as butyl rubber. While the support member 30 is turning in the direction d, from the position of FIG. 3 to the position of FIG. 4 and then to the position of FIG. 5, under the influence of the force acting to move the drive member 20 in the direction b, the cleaning member 36 slides over the surface of the object lens 8 located in the reading portion 6a of the optical head 6, which is in the limit position of its movement in the direction a. With this sliding of the cleaning member 36, dust on the surface of the object lens 8 is removed by the brush or the elastomer.

Whenever the reading operation by the optical head 6 is stopped, the drive member 20 is moved in the direction b so that the reading portion 6a is always cleaned by the cleaning member 36 and, after the cleaning, the reading portion 6a is surely covered by the shutter 30a.

When the reproducing operation is started, the drive member 20 is moved back in the direction a and the support member 30 is turned back in the direction e by the resiliency of the spring 32. At this time, the cleaning member 36 slider over the reading portion 6a again for cleaning the surface of the object lens 8.

In this way, the reading portion 6a is cleaned once immediately before the reading portion 6a is covered by the shutter 30a when the reading operation is stopped, and it is also cleaned once immediately before start of the reading operation. Accordingly, the reading operation is started in the best condition free from dust deposited on the reading portion 6a.

In the second embodiment of the present invention shown in FIGS. 6 to 9, a bent corner of the support member 30 having an L-shaped plan view serves as a shutter 30b. As with the embodiment shown in FIGS. 3 to 5, the cleaning member 36 is disposed on the underside of the support member 30 in an inner portion of the bent corner. The cleaning member 36 is a brush as shown in FIG. 2A, or an elastomer such as butyl rubber as shown in FIG. 2B.

The support member 30 has teeth 30c formed along an outer peripheral edge of its free end. The teeth 30c are formed by a series of projection and recesses of predetermined pitch as with a gear. The teeth 30c are arranged along an arcuate pass line of predetermined radius about the shaft 31. Further, in the embodiment shown in FIGS. 6 to 9, the turntable 2 has two toothed portions 2a, 2a formed partially along an outer circumference thereof. The toothed portions 2a, 2a are each formed by a series of projection and recesses of the same predetermined pitch as the teeth 30c on the support member 30.

As shown in FIG. 6, when the drive member 20 is returned in the direction a, i.e., when the optical head 6 is reciprocally moved for reading, the support member 30 is turned in the direction e by the return biasing force of the spring 32 and the stop 34 is held in abutment with the push lug 20e of the drive member 20. At this time, the shutter 30b and the cleaning member 36 are positioned away from the reading portion 6a of the optical head 6.

When the reading portion is stopped, the optical head 6 reaches the limit position in its movement in the direction a, and the motor 10 continues producing power to move the drive member 20 in the direction b, the support member 30 is turned in the direction d and comes to the position where the push lug 20e of the drive member 20 fits into the lock recess 35 of the support member 30.

At the time represented by the condition of FIG. 8, the reading portion 6a of the optical head 6 held in the limit position of its movement in the direction a is covered by the shutter 30b. In other words, during the non-reading or stopped period, the components always take the condition of FIG. 8 and the object lens 8 in the reading portion 6a is covered by the shutter 30b. As a result, dust is less apt to deposit on the reading portion 6a during the reading halt or stopped period. Also, in the condition of FIG. 8, the cleaning member 36 comes close to the reading portion 6a.

Furthermore, while the support member 30 is turning in the direction d from the position of FIG. 6, the teeth 30c formed on the support member 30 reaches a position where they can mesh with the toothed portion 2a of the turntable 2. When a non-toothed portion 2b on the outer circumference of the turntable 2 is present in the path of movement of the teeth 30c while the support member 30 is turning in the direction d, the teeth 30c and the toothed portion 2a will not mesh with each other until reaching the condition of FIG. 8. On the other hand, when the toothed portion 2a of the turntable 2 is present in the path of movement of the teeth 30c while the support member 30 is turning in the direction d, the teeth 30c and the toothed portion 2a will mesh with each other halfway the turning of the support member 30. At this time, if power for driving the drive shaft 3 of the spindle motor is switched off and the turntable 2 is freely rotated clockwise due to movement of the support member 30.

Figure 9:
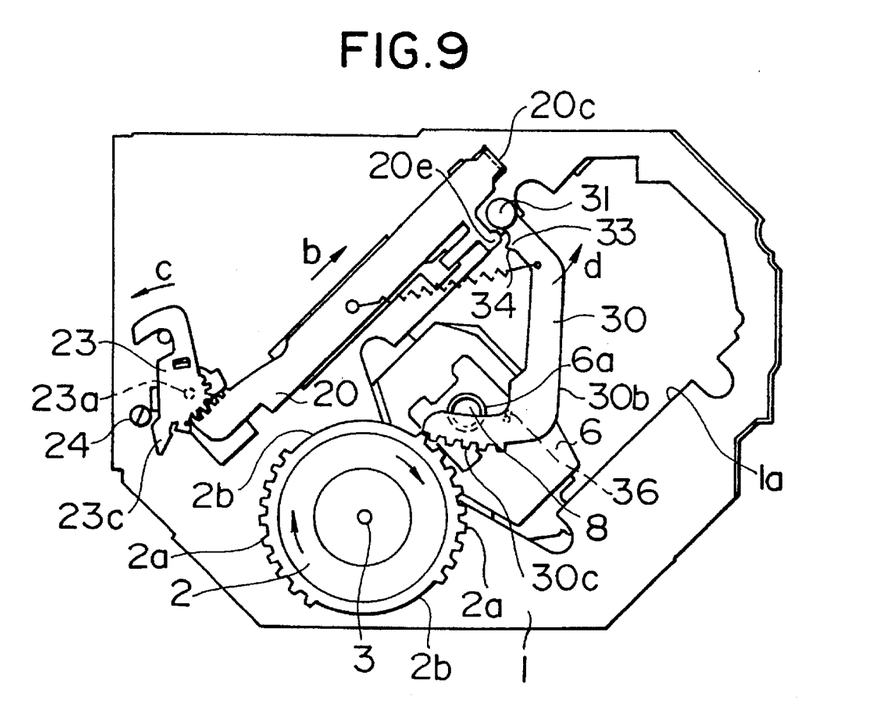
FIG. 9 is a plan view of the second embodiment of the invention, the view showing the condition where the cleaning member is moved by a disk rotating/driving member.

After the reading portion 6a of the optical head 6 has been covered by the shutter 30b as shown in FIG. 8, the spindle motor is driven for a predetermined time to rotate the turntable 2 clockwise for a predetermined number of rotations. At this time, when the toothed portion 2a formed partially along the outer circumference of the turntable 2 comes into mesh with the teeth 30c of the support member 30, the support member 30 is turned a certain angle in the direction d as shown in FIG. 9. When the teeth 30c disengage from the toothed portion 2a, the support member 30 is rotated in the direction e and is returned to the position of FIG. 8 where the lock recess 35 hits against the push lug 20e. After that, when the other toothed portion 2a of the turntable 2 comes into mesh with the teeth 30c, the support member 30 is turned again in the direction e and is then returned in the direction d.

Stated otherwise, when the turntable 2 is turned clockwise from the condition of FIG. 8, the support member 30 is turned back and forth in a reciprocal manner. While the cleaning member 36 is positioned close to the reading portion 6a in the condition of FIG. 8, it is moved to reciprocally slide over the surface of the object lens 8 in the reading portion 6a many times as the support member 30 is reciprocally turned from the condition of FIG. 8. As a result of the reciprocal sliding of the cleaning member 36, the reading portion 6a is completely cleaned and dust, etc., can be surely removed.

In this embodiment, when the reading operation by the optical head 6 is completed, the reading portion 6a is covered by the shutter 30b as shown in FIG. 8 and, with the subsequent clockwise rotation of the turntable 2, the reading portion 6a is cleaned several times by the cleaning member 36, followed by returning to the condition of FIG. 8 where the reading portion 6a is covered by the shutter 30b. Consequently, when starting the reading operation, less dust, etc., is deposited on the reading portion 6a, ensuring that the reading is performed with high accuracy.

Alternatively, the control circuit may be designed to rotate the spindle motor in the non-reading or stopped period immediately after the reading portion 6a has been covered by the shutter 30b of the support member 30, as shown in FIG. 8, so that the support member 30 is always reciprocally turned the predetermined number of times with the rotation of the turntable 2. As an alternative, the control circuit may be designed to count the accumulated time of the reading operation and to rotate the turntable 2 when the resulting count exceeds a certain value. As another alternative, the turntable 2 may be driven to rotate only when a cleaning switch on the control panel is depressed.

In any of the embodiment shown in FIGS. 3 to 5 and the embodiment shown in FIGS. 6 to 9, since both the shutter and the cleaning member are provided on the support member 30, it is possible to not only cover the reading portion 6a by the shutter, but also clean the reading portion 6a using the cleaning member 36.

In the second embodiment shown in FIGS. 6 to 9, the driving force by which the drive member 20 and the support member 30 are moved to the position shown in FIG. 8 may be produced by utilizing power from motors (such as the spindle motor 2) other than the motor 10.

Figure 10:
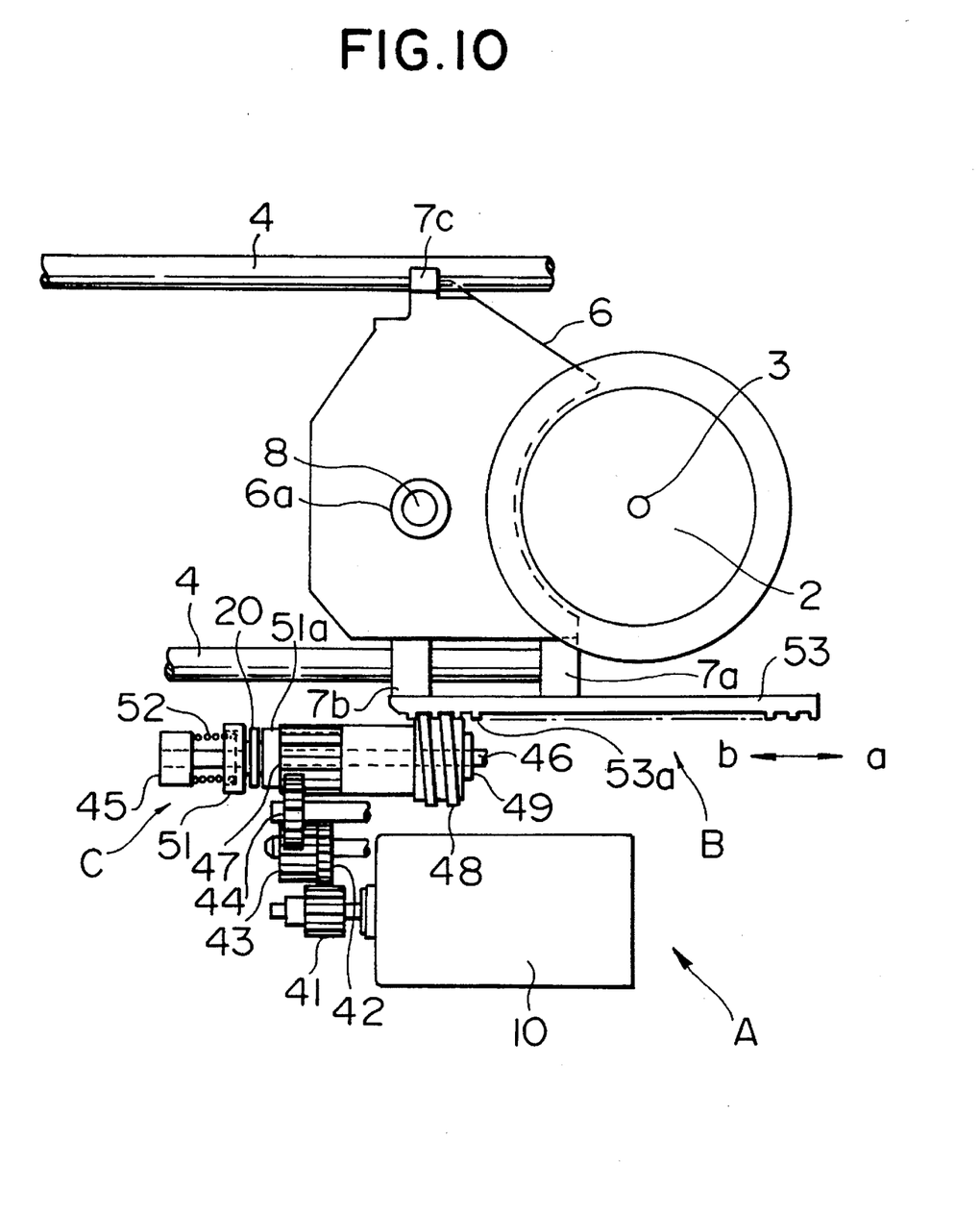
FIG. 10 is a plan view showing a head driver, a power converter, and a power switcher according to another embodiment of the present invention.
Figure 11:
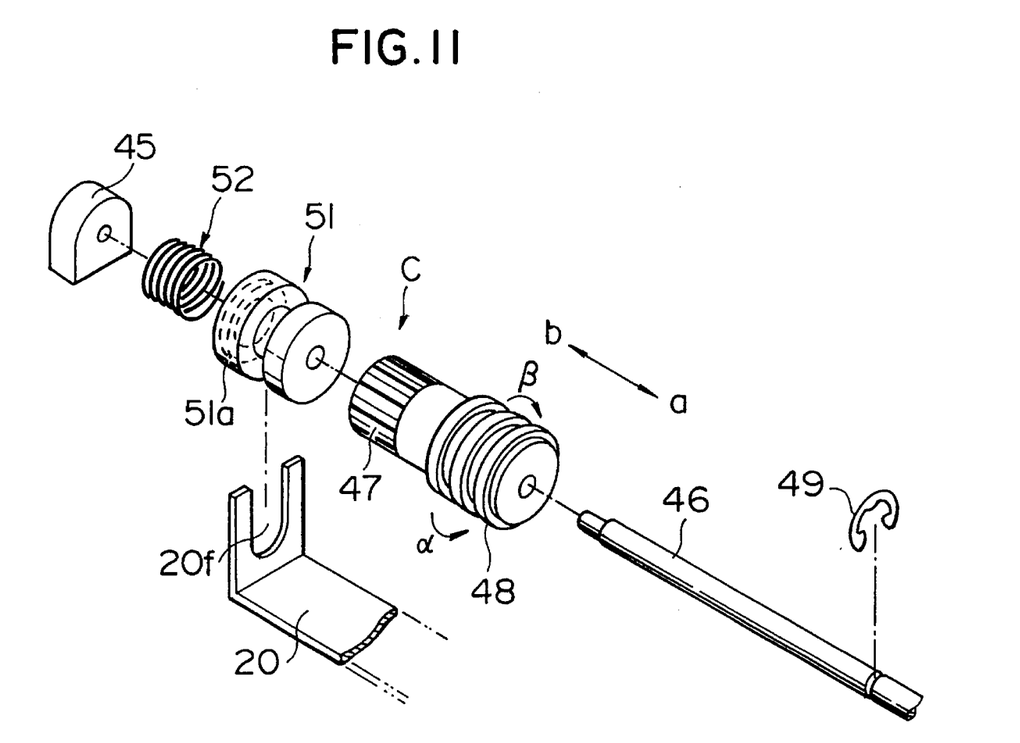
FIG. 11 is an exploded perspective view showing a principal part of FIG. 10.

FIG. 10 is a plan view showing another embodiment of the head driver A, the power converter B and the power switcher C, and FIG. 11 is an exploded perspective view of principal components shown in FIG. 10.

A pair of guide shafts 4, 4 are fixed to the chassis 1, and bearings 7a, 7b and 7c of a head base mounting an optical head 6 thereon are guided by the guide shafts 4, 4 so that the optical head 6 is movable in the directions a and b.

The rotative power of the motor 10 is transmitted from a pinion gear 41 to a gear 42, and then from a gear 43 integral with the gear 42 to the drive gear 44, these gears jointly making up a reduction mechanism.

As shown in FIG. 11, a shaft 46 is fixed to a shaft support 45 which is in turn fixed to the chassis 1. A driven gear 47 and a worm gear 48 integral with the driven gear 47 are inserted over the shaft 46 and is slidable in the directions a and b. The drive gear 44 is meshed with the driven gear 47. A stop ring 49 is fixedly fitted over the shaft 46 to limit movement of the driven gear 47 and the worm gear 48 in the direction a.

A ring 51 is slidably inserted over the shaft 46, and a recess 20f defined in a bent portion of a drive member 20 is fitted in a slot 51a formed in an outer circumference of the ring 51. The drive member 20 has the same function as the drive member 20 shown in FIG. 1, and includes the push lug 20e to move the support member 30.

A compression spring 52 is interposed between the ring 51 and the shaft support 45 so that the ring 51, the driven gear 47 and the worm gear 48 are always biased in the direction a by the resiliency of the spring 52.

As shown in FIG. 10, a rack member 53 as a fitting member is fixed to the bearings 7a and 7b provided on the head base. The rack member 53 has a length corresponding to the stroke over which the optical head 6 is moved for reading signals. The rack member 53 has teeth 53a meshed with the worm gear 48.

In this embodiment, the worm gear 48 and the rack member 53 jointly make up the power converter B, and the driven gear 47, the worm gear 48 and the ring 51 which are movable in the direction b with respect to the shaft 46 jointly make up the power switcher C.

In the embodiment shown in FIGS. 10 and 11, the rotative power of the motor 10 is transmitted to the driven gear 47 through the reduction mechanism comprising the gears 41, 42, 43 and 44. When the driven gear 47 and the worm gear 48 are rotated in the direction α, there produces force acting to move the rack member 53 meshed with the worm gear 48 in the direction a, moving the optical head 6 in the direction a. When the motor 10 is reversed in the rotating direction to rotate the worm gear 48 in the direction β, the rack member 53 and the optical head 6 are moved in the direction b. During such reciprocal movement, the optical head 6 reads signals from the disk D.

After the worm gear 48 is rotated in the direction α and the optical head 6 is moved in the direction a to a limit position of its movement where the reading portion 6a faces an innermost peripheral area of the disk D and the optical head 6 can no longer move in the direction a, the motor 10 is kept energized to continue rotating the worm gear 48 in the direction α. Since the rack member 53 is now kept stationary, the rotating worm gear 48 is moved in the direction b against the biasing force of the spring 52 and the ring 51 is also moved in the direction b. Accordingly, the drive member 20 fitted at the recess 20f thereof with the ring 51 is likewise moved in the direction b.

In other words, when the reading operation is stopped, the worm gear 48 is continuously rotated in the direction α by the motor 10 even after the optical head 6 has reached the limit position of its movement in the direction a, thereby producing force acting to move the worm gear 48 in the direction b and thereby moving the drive member 20 in the direction b. With this force acting to move the drive member 20, the support member 30 is turned in the direction d as described above in connection with FIGS. 3 to 9.

While the reading operation on the disk D has been described in the foregoing embodiments, signals may be recorded in the disk D using a recording device such as an optical head or any other suitable magnetism applying member when the disk D is a recordable medium. The present invention is also applicable to such a case.

As described hereinabove, according to the first embodiment of the present invention, by utilizing the power of the head driver for moving the optical head, the shutter is moved to a position where it can reliably cover the reading portion of the optical head, and/or the cleaning member is moved to slide over the reading portion for cleaning the same. Since the shutter and/or the cleaning member is moved by utilizing the power of the head driver, an additional drive source is not required and hence the disk apparatus can be simplified in structure and reduced in size.

According to the second embodiment of the present invention, the support member is operated by the torque of the disk rotating/driving member in such a manner as to slide the cleaning member over the reading portion, and additional power is not needed for operating the cleaning member.

If the power of the head driver is utilized to move the support member, the support member can be moved to a position where the cleaning member on the support member comes close to the reading portion, and hence the need for a specific power source is totally eliminated.

What is claimed is:

1. A disk apparatus for reading data from an information bearing disk, comprising:

a turntable for rotatably supporting the information bearing disk;

a carriage including an optical head and an engaging member, the carriage being movable in first and second directions over the information bearing disk, movement of the carriage in the first direction being stopped by a stop member when the carriage is moved from a reading position, in which the optical head is located over a recording area of the information bearing disk, to a retracted position, in which the optical head is positioned over a peripheral area of the information bearing disk and the carriage contacts the stop member;

a carriage positioning member coupled to the engaging member of the carriage such that rotation of the carriage positioning member in a rotating direction around an axis applies force to the engaging member, thereby causing movement of the carriage in the first direction toward the retracted position, the carriage positioning member being moved along the axis from a first position to a second position when the carriage positioning member is rotated in the rotating direction after the carriage is in the retracted position; and a shutter positioning assembly coupled to the carriage positioning member which positions a shutter over the optical head in response to movement of the carriage positioning member from the first position to the second position.

2. The disk apparatus according to claim 1, wherein the carriage positioning member comprises an elongated screw having a first gear fixedly connected to a first end, the elongated screw also having a second end, the elongated screw being movable along the axis from a first position to a second position when the elongated screw is rotated in the rotating direction after the carriage is in the retracted position;

wherein the engaging member is meshed with the screw and travels along the screw as the carriage positioning member is rotated around the axis;

wherein the shutter positioning assembly comprises;

a drive member disposed in parallel with the elongated screw, the drive member having a bent piece arranged to contact the second end of the elongated screw when the carriage positioning member is in the second position, the drive member also having a push lug, a support member pivotally mounted adjacent the push lug, the support member having a free end; and wherein the shutter is mounted on the free end of the support member.

3. The disk apparatus according to claim 2, wherein the support member further comprises a cleaning member positioned to wipe the optical lens when the support member is pivoted.

4. The disk apparatus according to claim 2, wherein the disk apparatus further comprises:

a motor including an output shaft and a second gear mounted on the output shaft; and a reduction mechanism meshed with the first gear and the second gear for transferring torque produced by the motor to the carriage positioning member.

5. The disk apparatus according to claim 2, further comprising:

a first resilient member connected to the carriage positioning member for biasing the carriage positioning member into the first position; and a second resilient member connected between the drive member and the support member for biasing the support member such that the shutter is positioned away from the optical head.

6. The disk apparatus according to claim 2, wherein the shutter positioning assembly further comprises a turn lever, the turn lever being engaged with the drive member such that movement of the elongated drive member causes the turn member to rotate; and wherein the disk apparatus further comprises a sensor for detecting rotation of the turn lever, thereby detecting that the shutter is positioned over the optical lens.

7. The disk apparatus according to claim 1, wherein the carriage positioning member comprises a shaft including a worm gear; and wherein the carriage includes a rack member meshed with the worm gear such that the carriage moves relative to the worm gear as the carriage positioning member is rotated around the axis.

8. A disk apparatus for reading data from an information bearing disk, comprising:

a turntable for rotatably supporting the information bearing disk;

a carriage including an optical head and an engaging member, the carriage being movable in first and second directions over the information bearing disk, movement of the carriage in the first direction being stopped by a stop member when the carriage is moved from a reading position, in which the optical head is located over a recording area of the information bearing disk, to a retracted position, in which the optical head is positioned over a peripheral area of the information bearing disk and the carriage contacts the stop member;

a carriage positioning member coupled to the engaging member of the carriage such that rotation of the carriage positioning member in a rotating direction around an axis applies a force to the engaging member, thereby causing movement of the carriage in the first direction toward the retracted position, the carriage positioning member being moved along the axis from a first position to a second position when the carriage positioning member is rotated in the rotating direction after the carriage is in the retracted position; and a cleaning member positioning assembly coupled to the carriage positioning member which wipes a cleaning member on the optical head as the carriage positioning member is rotated.

9. The disk apparatus according to claim 8, wherein the carriage positioning member comprises an elongated screw having a first gear fixedly connected to a first end, the elongated screw also having a second end, the elongated screw being movable along the axis from a first position to a second position when the elongated screw is rotated in the rotating direction after the carriage is in the retracted position;

wherein the engaging member is meshed with the screw and travels along the screw as the carriage positioning member is rotated around the axis;

wherein the cleaning member positioning assembly comprises:

an elongated drive member disposed in parallel with the elongated screw, the elongated drive member having a bent piece arranged to contact the second end of the elongated screw when the carriage positioning member is in the second position, the elongated drive member also having a push lug, a support member pivotally mounted adjacent the push lug, the support member having a free end; and wherein the cleaning member is mounted adjacent the free end of the support member.

10. The disk apparatus according to claim 9, wherein the disk apparatus further comprises:

a motor including an output shaft and a second gear mounted on the output shaft; and a reduction mechanism meshed with the first gear and the second gear for transferring torque produced by the motor to the carriage positioning member.

11. The disk apparatus according to claim 9, further comprising:

a first resilient member connected to the carriage positioning member for biasing the carriage positioning member into the first position; and a second resilient member connected between the drive member and the support member for biasing the support member such that the shutter is positioned away from the optical head.

12. The disk apparatus according to claim 9, wherein the shutter positioning assembly further comprises a turn lever, the turn lever being engaged with the drive member such that movement of the elongated drive member causes the turn member to rotate; and wherein the disk apparatus further comprises a sensor for detecting rotation of the turn lever, thereby detecting that the shutter is positioned over the optical lens.

13. The disk apparatus according to claim 8, wherein the carriage positioning member comprises a shaft including a worm gear; and wherein the carriage includes a rack member meshed with the worm gear such that the carriage moves relative to the worm gear as the carriage positioning member is rotated around the axis.

14. A disk apparatus for reading data from an information bearing disk, comprising:

a turntable for rotatably supporting the information bearing disk, the turntable having a first plurality of teeth formed along an outer periphery thereof;

a carriage including an optical head and an engaging member, the carriage being movable in first and second directions over the information bearing disk, movement of the carriage in the first direction being stopped by a stop member when the carriage is moved from a reading position, in which the optical head is located over a recording area of the information bearing disk, to a retracted position, in which the optical head is positioned over a peripheral area of the information bearing disk and the carriage contacts the stop member;

a carriage positioning member coupled to the engaging member of the carriage such that rotation of the carriage positioning member in a rotating direction around an axis applies a force to the engaging member, thereby causing movement of the carriage in the first direction toward the retracted position, the carriage positioning member being moved along the axis from a first position to a second position when the carriage positioning member is rotated in the rotating direction after the carriage is in the retracted position; and a cleaning member positioning assembly coupled to the carriage positioning member which wipes a cleaning member on the optical head as the carriage positioning member is moved from the second position to the first position, the cleaning member including:

a drive member disposed in parallel with the carriage positioning member and arranged to contact an end of the carriage positioning member when the carriage positioning member is in the second position, and a support member pivotally mounted adjacent the drive member, the support member having a second plurality of teeth formed along an edge thereof, the cleaning member being positioned adjacent the second plurality of teeth;

wherein the first plurality of teeth mounted on the turntable mesh with the second plurality of teeth formed on the support member such that rotation of the turntable is transmitted through the first and second pluralities of teeth to pivot the support member, thereby causing the cleaning member to wipe the optical head.

15. The disk apparatus according to claim 14, wherein the carriage positioning member comprises an elongated screw having a first gear fixedly connected to a first end, the elongated screw also having a second end;

wherein the engaging member is meshed with the screw and travels along the screw as the carriage positioning member is rotated around the axis;

wherein the elongated drive member is disposed in parallel with the elongated screw, the elongated drive member having a bent piece arranged to contact the second end of the elongated screw when the carriage positioning member is in the second position, the elongated drive member also having a push lug; and wherein the support member slidably contacts the push lug such that movement of the elongated drive member causes pivoting of the support member in a first pivoting direction.

* * * * *